Oct. 15, 1940.         G. J. HOPKINS         2,218,208
                         COOLER
                   Filed March 18, 1938        2 Sheets-Sheet 1
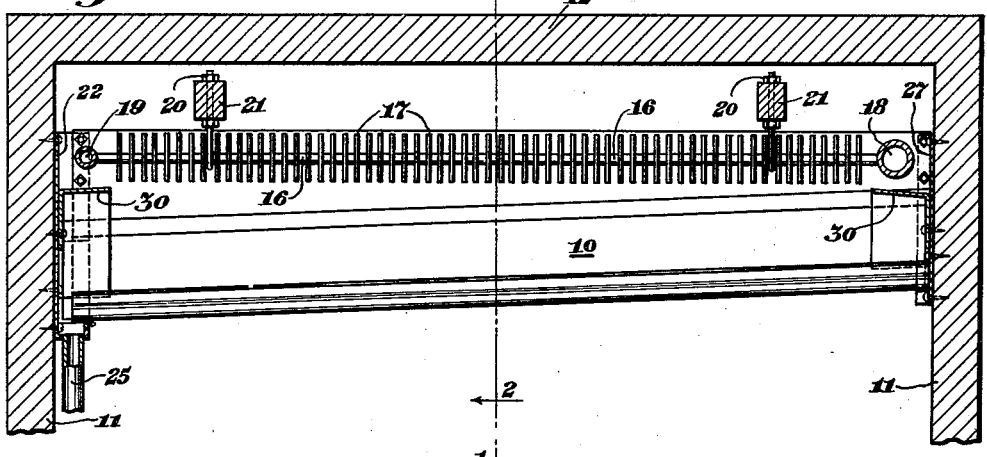
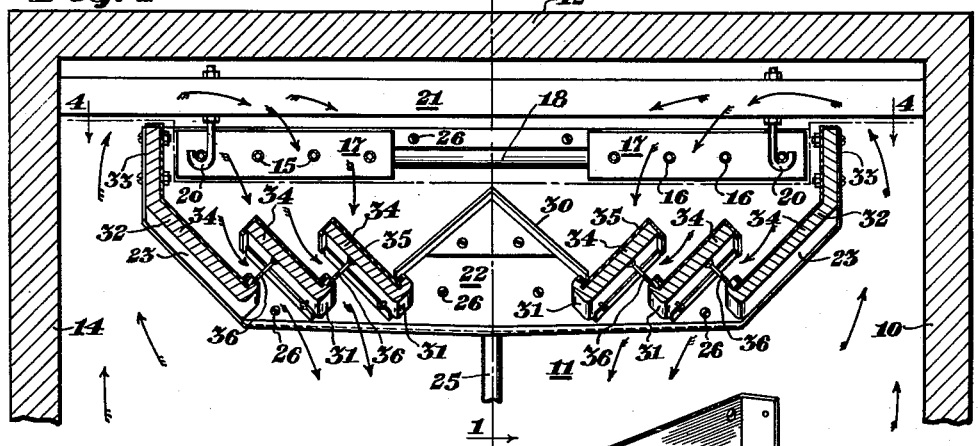
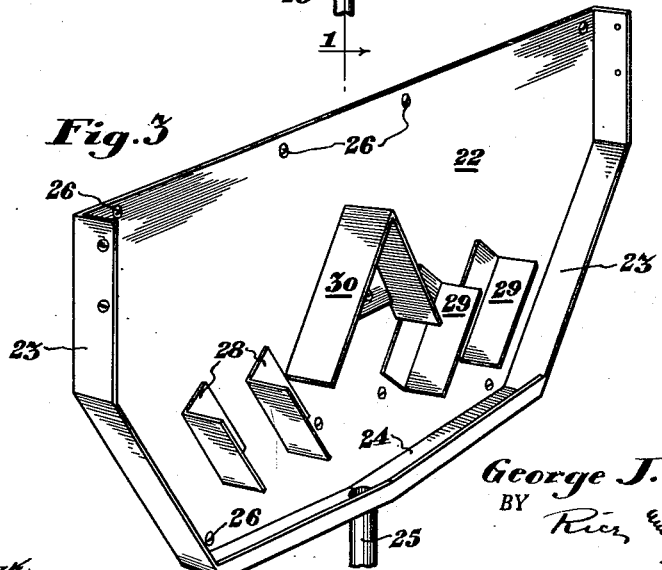
INVENTOR.
George J. Hopkins
BY
Rice & Rice
ATTORNEYS.
Witness:
John S. Braddack Oct. 15, 1940.    G. J. HOPKINS    2,218,208
COOLER
Filed March 18, 1938    2 Sheets-Sheet 2

INVENTOR.
George J. Hopkins
BY
Rice & Rice
ATTORNEYS.

Witness:
John S. Braddock

Patented Oct. 15, 1940

2,218,208

UNITED STATES PATENT OFFICE 2,218,208

COOLER

George J. Hopkins, Kendallville, Ind., assignor to McCray Refrigerator Company, Kendallville, Ind., a corporation of Indiana Application March 18, 1938, Serial No. 196,620

4 Claims. (Cl. 62—103)

The present invention relates to refrigerators and more particularly to refrigerators of the cooler type such as are used in meat markets and butcher shops.

The primary objects of the instant invention are to provide a refrigerated cooler having a plurality of drip pans positioned in a manner to form baffles for inducing and directing the circulation of air within the cooler; to provide such a cooler whose drip pan baffles are individually removable to give ready access for servicing the cooler; to provide such a cooler whose drip pan baffles may be readily and conveniently installed in use; to provide such a cooler whose drip pan baffles are insulated to prevent the condensation of moisture and resultant drip from their under sides; and, to provide such a cooler which is highly efficient and utilitarian in use.

Illustrative embodiments of the invention are shown in the accompanying drawings, wherein:

Figure 1 is a sectional view of the cooler on line 1—1 of Figure 2;

Figure 2 is a sectional view thereof on line 2—2 of Figure 1;

Figure 3 is an enlarged perspective view of one of the supporting brackets for the drip pan baffles;

Figure 4:
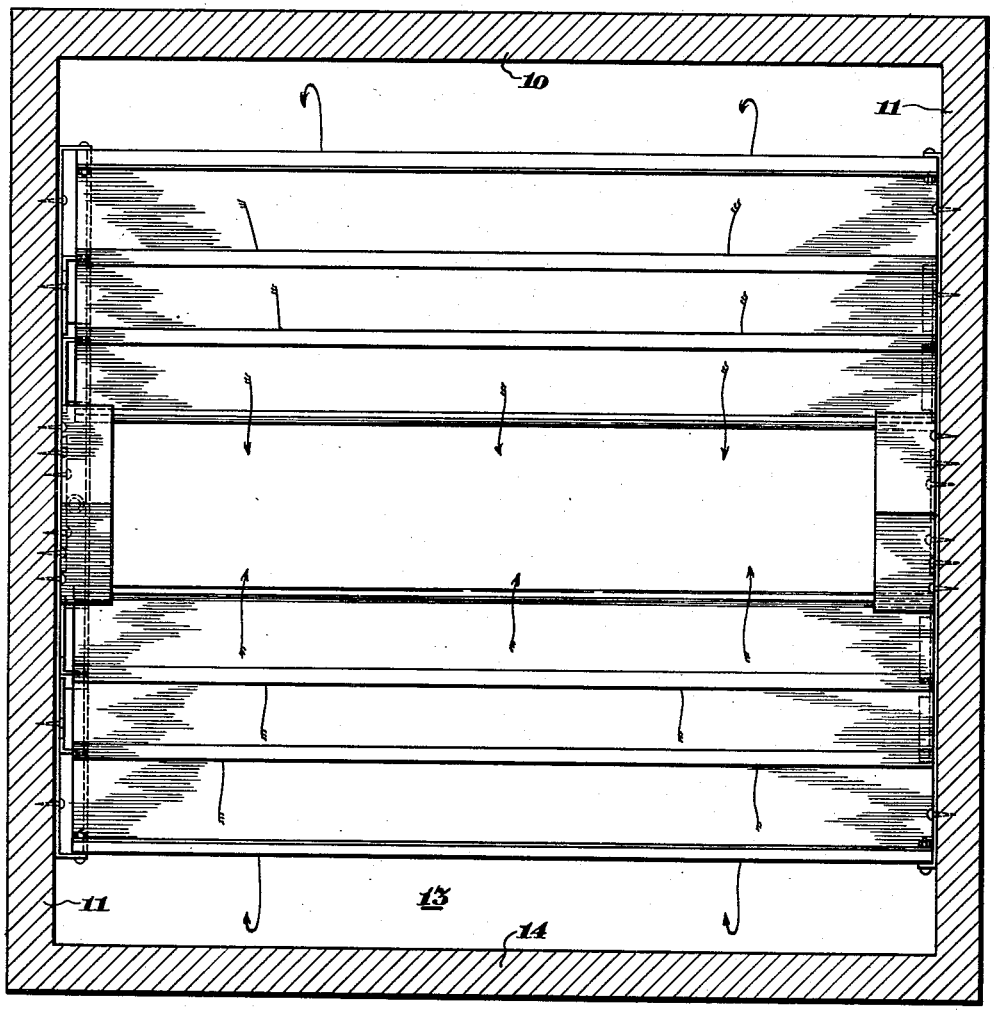
Figure 4 is a sectional view on line 4—4 of Figure 2.

Referring then to the drawings wherein like parts of the structure shown are designated by the same numerals in the several views, a cooler of the general character conventionally used in butcher shops and meat markets is provided with a rear wall 10, end walls 11, top 12, floor 13 and a front wall 14 having a door, not shown, for giving ingress to and egress from the interior of the cooler.

Means here shown for refrigerating the interior of the cooler comprises a pair of oppositely disposed and parallelly spaced batteries of cooling coils 15, 16 each of which batteries is provided with a plurality of spaced transverse fins 17. One end of each coil is connected with an intake header 18 supplying a refrigerating fluid of conventional character whereas the opposite end of each coil is connected with a discharge header 19.

Brackets 20 suspended from oppositely disposed beams 21 secured between the inner surface of the front wall 14 and the inner surface of the rear wall 10 near the end walls 11 of the cooler are provided with hooks at their lower ends for supporting the opposite ends of one of the coils of each battery of coils 15, 16 and their connected headers 18, 19, the suspension being immediately below the top 12 of the cooler to give adequate head room within the interior thereof.

A plate, here shown as of stamped sheet metal and generally designated 22, is provided with flanged end walls 23 and with a trough bottom 24 having a drain conduit 25, all as best shown in Figure 3. This plate is secured to the inner surface of one end wall of the cooler in any suitable manner as by screws 26, and a similar plate 27 without a drain conduit is similarly secured to the inner surface of the opposite end wall as is shown in Figure 1. Each plate 22, 27 is provided with oppositely disposed pairs of angle iron bracket supports 28, 29 secured thereto as by spot welding, each support of each pair thereof being disposed at the same angle and each pair of supports being disposed at an angle opposite to the angle of the other pair of supports as best shown in Figure 3. A drain member 30, here shown as of inverted V-form and likewise of stamped sheet metal is also secured to the inner surface of each plate 22, 27 and below the headers 18 or 19 as by spot welding to catch the drip from the headers.

A battery of air baffle drip pans generally designated 31, 32 are angularly disposed beneath the length of each battery of refrigerating coils and each drip pan 31 is detachably and longitudinally angularly supported at its opposite ends by a pair of the oppositely disposed supports 28 or 29. Each outer drip pan 32 is seated at its opposite ends upon the flanged end wall 23 of each plate 22 or 27 and each of these drip pans is provided with a vertically disposed insulated side wall 33 extending above the upper level of an outside coil 15 or 16 of its battery between the length thereof and the adjacent inner wall of the cooler.

Figure 5:
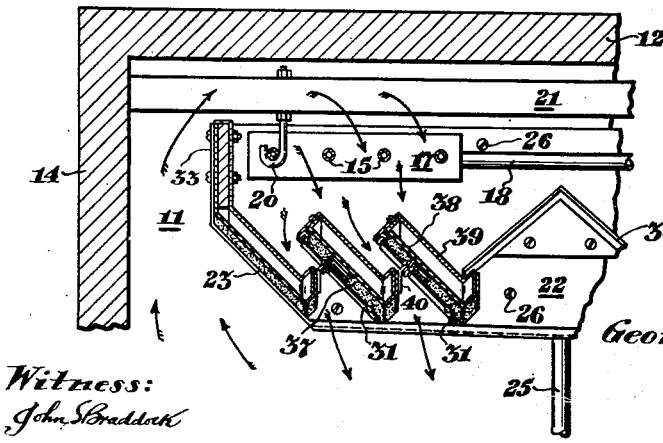
Figure 5 is a sectional view similar to Figure 2 but showing a modified form of the drip pan baffle construction.

The drip pans shown in Figure 2 have insulating portions 34 of wood or the like disposed between their supports and their sheet metal facings 35 and are held in angularly spaced positions as by screws 36 whereas the drip pans shown in Figure 5 have sheet metal dual spaced walls 38, 39 whose dead air space therebetween provides insulation and which drip pans are secured in angularly spaced relation by means of spacing pins 40. The under sides of the drip pans shown in Figure 5 are provided with a roughened dull material 37 of low heat conductivity which roughened dull material tends to decrease dripping resulting from any moisture condensation that may occur.

The material 37 may be of asphalt and ground cork or of rubber, or the surface may be sprayed with a water resistant material adapted to be baked for hardening but which material is thereafter sprayed with ground fibre, such as rayon or the like while the water resistant material is still wet and before it is baked and becomes hardened.

In operation and during the time the compressor is forcing fluid refrigerant from the intake header 19 into the coils 15, 16 and out through the discharge header 18, air within the cooler is caused to travel downwardly from the finned coils 15, 16 between the air baffle drip pans 31, 32 toward the floor, thence upwardly along the opposite inside walls and finally back over the finned coils 15, 16 when the cycle is repeated and as is indicated by the arrows in Figures 2 and 5.

Water condensing upon the coils 15, 16 or from the headers 18, 19 is dropped to the upper surfaces of the angularly disposed drip pans 31, 32 along which it flows by gravity to the drain through 24 and out through the drainage conduit 25.

The air baffle drip pans 31, 32 being insulated on their under surfaces, no moisture condensation thereon takes place to thereafter drip or fall upon the food products within the cooler and since the arrangement of the baffles herein shown and described forms a "flue" inducing and directing air circulation over the top of the coils 15, 16 unlike that in Tinkey Patent No. 1,975,337 and as herein set forth, no stagnant air pockets are present within the cooler. The drip pans are removable, the cooler is efficient and utilitarian in use and while but several specific embodiments of the invention have been herein shown and described, it will be understood that certain details of the constructions shown may be altered or omitted without departing from the spirit of this invention as the same is defined by the following claims.

I claim:

1. A cooler having a pair of spaced overhead parallel and horizontally disposed refrigerating coils running substantially the length of the interior of the cooler, a plate secured adjacent the inner surface of each opposite end wall, each plate having opposite angularly disposed supports secured below a coil, and an air baffle drip pan detachably supported upon an angularly disposed support beneath each coil, each drip pan having a vertically disposed side wall extending above the upper level of the refrigerating coils between the length thereof and the adjacent inner wall of the cooler whereby the circulation of the air within the cooler is caused to travel downwardly from the coils between the pair of air baffle drip pans, thence upwardly between each opposite outside side wall of each drip pan and the adjacent inner wall of the cooler, and finally over the top of each coil to repeat the cycle of air circulation therein.

2. A cooler having a pair of spaced overhead parallel and horizontally disposed refrigerating coils running substantially the length of the interior of the cooler and connected interjacent a transversely disposed intake header adjacent one end wall and a transversely disposed discharge header adjacent the opposite end wall, a plate secured adjacent the inner surface of each opposite end wall, each plate having opposite angularly disposed supports secured below a coil, and an air baffle drip pan detachably supported upon an angularly disposed support beneath each coil, each drip pan having a vertically disposed side wall extending above the upper level of the refrigerating coils between the length thereof and the adjacent inner wall of the cooler whereby the circulation of the air within the cooler is caused to travel downwardly from the coils between the pair of air baffle drip pans, thence upwardly between each opposite outside side wall of each drip pan and the adjacent inner wall of the cooler, and finally over the top of each coil to repeat the cycle of air circulation therein.

3. A cooler having overhead refrigerating means, and drip pans having dual spaced walls disposed beneath the refrigerating means, the under surfaces of said drip pans being provided with a water resistant dull roughened material of low heat conductivity covered with ground fibre.

4. A cooler having a pair of spaced overhead parallel and horizontally disposed refrigerating coils running substantially the length of the interior of the cooler and connected interjacent a transversely disposed intake header adjacent one end wall and a transversely disposed discharge header adjacent the opposite end wall, a plate secured adjacent the inner surface of each opposite end wall, each plate having opposite angularly disposed supports secured below a coil, an air baffle drip pan detachably supported upon an angularly disposed support beneath each coil, an inverted V-form drain member secured to each plate beneath the header adjacent thereto for conducting drip from the headers to said drip pans, and each drip pan having a vertically disposed side wall extending above the upper level of its adjacent coil between the length thereof and the adjacent inner wall of the cooler whereby the circulation of the air within the cooler is caused to travel downwardly from the coils between the pair of air baffle drip pans, thence upwardly between each opposite outside side wall of each drip pan and the adjacent inner wall of the cooler, and finally over the top of each coil to repeat the cycle of air circulation therein.

GEORGE J. HOPKINS.